US012606998B2

(12) United States Patent
Dueck et al.

(10) Patent No.: US 12,606,998 B2
(45) Date of Patent: Apr. 21, 2026

(54) SANITARY ROOM OF A BUILDING

(71) Applicant: JOMOO KITCHEN & BATH DEUTSCHLAND GMBH, Munich (DE)

(72) Inventors: Johann Dueck, Feurstenfeldbruck (DE); Fabian Kreuzer, Munich (DE); Thomas Richter, Munich (DE); Benjamin Mohrich, Munich (DE); Daniel Gemmecke, Munich (DE); Muya Hong, Munich (DE); Lin Xiaowei, Fujian (CN)

(73) Assignee: JOMOO KITCHEN & BATH DEUTSCHLAND GMBH, Munich (DE)

( * ) Notice: Subject to any disclaimer, the term of this patent is extended or adjusted under 35 U.S.C. 154(b) by 234 days.

(21) Appl. No.: 18/512,656

(22) Filed: Nov. 17, 2023

(65) Prior Publication Data

US 2024/0084564 A1 Mar. 14, 2024

Related U.S. Application Data

(63) Continuation of application No. PCT/EP2022/062733, filed on May 11, 2022.

(30) Foreign Application Priority Data

May 20, 2021 (DE) ..................... 10 2021 113 091.3

(51) Int. Cl.
*E03C 1/05* (2006.01)
*E03B 1/04* (2006.01)
(Continued)

(52) U.S. Cl.
CPC ................ *E03C 1/055* (2013.01); *E03B 1/04* (2013.01); *E03C 1/04* (2013.01); *F21V 33/004* (2013.01);
(Continued)

(58) Field of Classification Search
CPC .................................. E03C 1/055; E03C 1/04
See application file for complete search history.

(56) References Cited

U.S. PATENT DOCUMENTS 4,563,780 A 1/1986 Pollack
4,756,030 A 7/1988 Juliver
(Continued)

FOREIGN PATENT DOCUMENTS

DE 197 02 358 A1 7/1998
DE 102016104793 A1 * 9/2017 ........... E03C 1/0408
(Continued)

OTHER PUBLICATIONS

Translation of DE 102016104793 A1 (Year: 2025).*
(Continued)

*Primary Examiner* — Janie M Loeppke
(74) *Attorney, Agent, or Firm* — Myers Wolin, LLC

(57) ABSTRACT

A sanitary room of a building has an access point for persons and a sanitary station, which has a sanitary apparatus having a metering and mixing valve unit, a lighting apparatus, and a sound apparatus. A programmable electronic controller influences the metering and mixing valve unit, the lighting apparatus, and the sound apparatus. The electronic controller has a memory for storing water discharge programs, a memory for storing lighting programs, a memory for storing sound programs, and a data-processing unit, which operates an actuator of the metering and mixing valve unit, an illuminant controller, and a sound generator. The sanitary station includes a device user interface associated with the sanitary apparatus which allows one of the water discharge programs to be selected and manually modified. Adjacent the access point, a room user interface is provided, which allows lighting programs and sound programs to be selected and manually modified.

18 Claims, 6 Drawing Sheets

(51) Int. Cl.

| | |
|---|---|
| ***E03C 1/04*** | (2006.01) |
| ***F21V 33/00*** | (2006.01) |
| ***H05B 47/175*** | (2020.01) |
| ***H05B 47/19*** | (2020.01) |

(52) U.S. Cl.

CPC ........... *H05B 47/196* (2024.01); *H05B 47/19* (2020.01); *H05B 47/1965* (2024.01); *H05B 47/197* (2024.01)

(56) References Cited

U.S. PATENT DOCUMENTS

| | | | | |
|---|---|---|---|---|
| RE35,018 | E | 8/1995 | Homan | |
| 6,029,094 | A * | 2/2000 | Diffut | G05D 23/1393 700/20 |
| D591,182 | S * | 4/2009 | Schoenherr | D10/49 |
| 8,028,355 | B2 | 10/2011 | Reeder et al. | |
| 9,085,881 | B2 | 7/2015 | Hanna et al. | |
| 10,745,893 | B2 | 8/2020 | Silverstein et al. | |
| 10,887,125 | B2 * | 1/2021 | Rexach | E03D 9/002 |
| 2004/0204779 | A1 | 10/2004 | Mueller et al. | |
| 2008/0259056 | A1 | 10/2008 | Freier et al. | |
| 2013/0170839 | A1 | 7/2013 | Yuan | |
| 2015/0218784 | A1 | 8/2015 | Mazz et al. | |
| 2017/0350103 | A1 | 12/2017 | Lee et al. | |
| 2019/0274485 | A1 * | 9/2019 | Tsibulevskiy | A45D 42/24 |

FOREIGN PATENT DOCUMENTS

| | | | |
|---|---|---|---|
| DE | 10 2017 105 187 | A1 | 9/2018 |
| EP | 3 088 613 | A1 | 11/2016 |
| EP | 2 649 246 | B1 | 8/2017 |
| EP | 3 705 642 | A1 | 9/2020 |
| WO | 2008/130349 | A1 | 10/2008 |
| WO | 2011/094455 | A1 | 8/2011 |
| WO | 2012/075592 | A1 | 6/2012 |

OTHER PUBLICATIONS

International Search Report issued by the European Patent Office for International Patent Application No. PCT/EP2022/062733, mailed on Sep. 13, 2022, with English translation attached.

* cited by examiner

Fig. 8
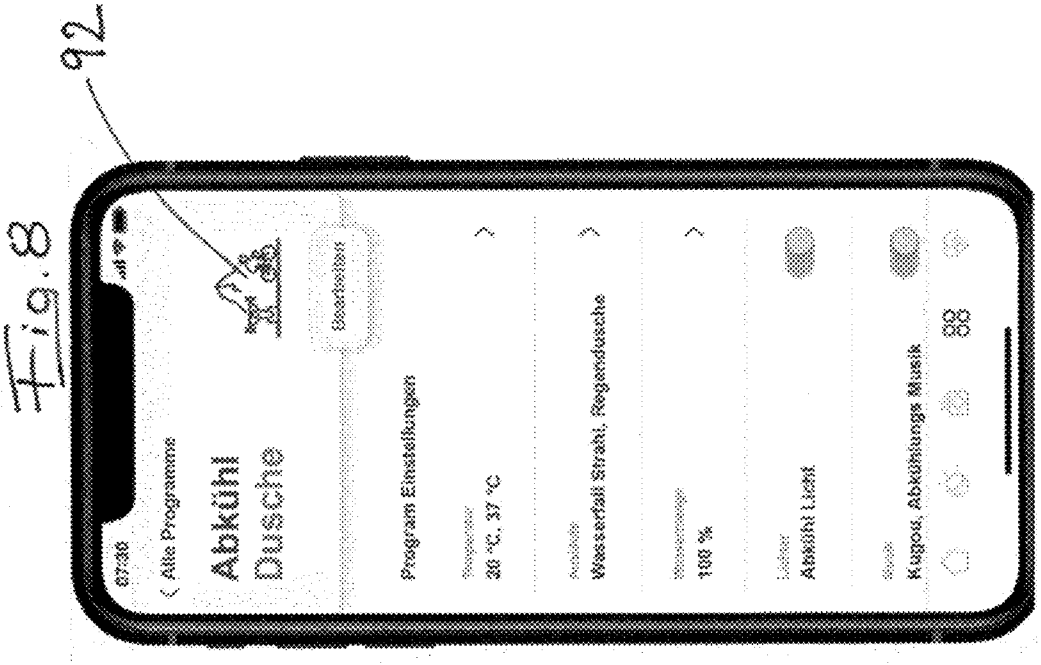
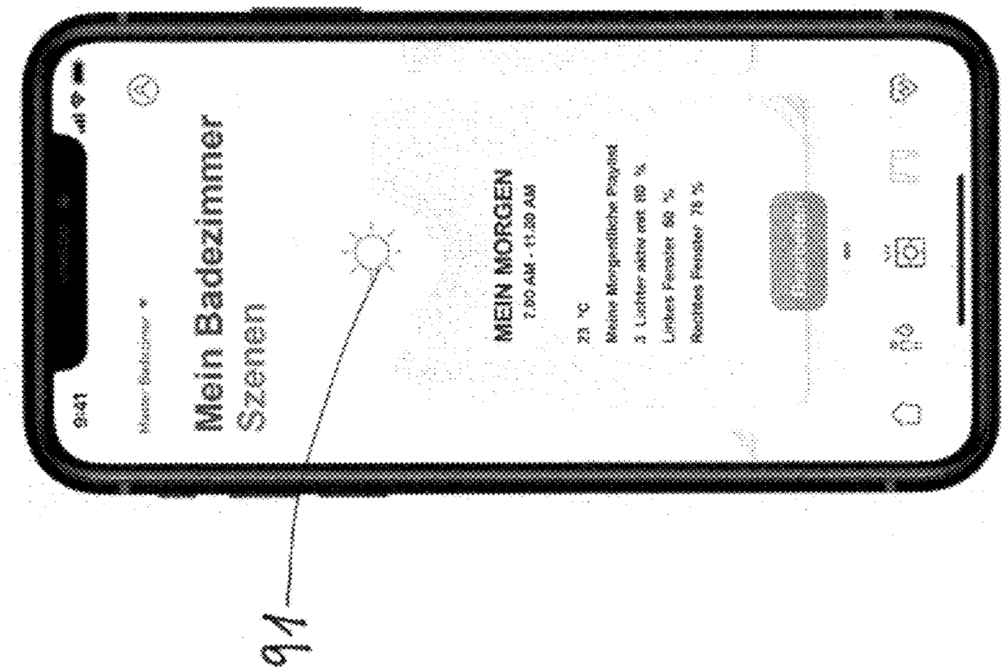
Fig. 7

SANITARY ROOM OF A BUILDING

CROSS REFERENCE TO RELATED APPLICATIONS

This application is a continuation under 35 U.S.C. § 120 of International Application PCT/EP2022/062733, filed May 11, 2022, which claims priority to German Application No. 10 2021 113 091.3, filed May 20, 2021, the contents of each of which are incorporated by reference herein.

FIELD OF THE INVENTION

The present invention relates to a sanitary room of a building, having A people entrance, at least one sanitary station, a lighting device and a sound device, wherein the sanitation station is provided with a sanitary facility having a cold-water supply, a hot-water supply, at least one water outlet and a metering and mixing valve unit, which is suitable for influencing the total flow through the water outlet and the ratio of the partial quantity of cold water and the partial quantity of hot water relative to one another in the total flow, and a programmable electronic control system acts on the metering and mixing valve unit, the lighting device and the sound device.

BACKGROUND

The patent literature has already been concerned for many years with program-controlled sanitary facilities, especially program-controlled showers. Examples worthy of mention are DE 197 02 358 A1, EP 3 705 642 A1, US 2017/0350103 A1, EP 3 088 613 A1, U.S. Pat. No. 9,085,881 B2, U.S. Re. 35,018 E, U.S. Pat. Nos. 4,563,780 A, 4,756,030 A, DE 10 2016 104 793 B4, U.S. Pat. No. 10,745,893 B2 and EP 2 649 246 B1. For this purpose, the electronic control unit comprises a program memory suitable for storage of several different water-delivery programs (shower programs) capable of being called and a central data-processing unit, which acts according to each water-delivery program on an actuator for operation of at least one of the metering and mixing valve units. The shower program to be respectively implemented may then be selected either manually or partly or fully automatically (for example, by integration of automatic user identity recognition or user condition recognition). In some cases (see in particular EP 3 705 642 A1), such a called water-delivery program is intended to take further parameters into consideration or to vary them, such as various lighting effects, music to be played back at the shower location, other acoustics and/or videos and/or fragrance effects that can be provided at the shower location, and so on.

Special user interfaces supporting operator control of the program-controlled sanitary facilities or of the electronic control units associated therewith are likewise subject matter of the patent literature (see, for example, US 2008/0259056 A1, US 2013/0170839 A1, US 2015/0218784 A1 and WO 2011/094455 A1).

DE 10 2017 105 187 A1 discloses a sanitary system having at least one sanitary facility and a communications unit capable of being connected therewith to transmit data and provided with a multiplicity of interfaces for communication with a multiplicity of different operator-control devices. This communications unit may also be set up such that it additionally predetermines or keeps track of the operation of at least one electronic component of the building services system.

U.S. Pat. No. 8,028,355 B2 discloses an integrated electronic system designed for bathrooms and having a multiplicity of sensors, which record variables of state of the bathroom and communicate associated signals to a control unit. Different sanitary units, such as showers, bathtubs, washbasins, etc., to which user interfaces having a memory for predetermined conditions stored according to user definitions as well as control elements capable of program selection and adaptation are assigned, may be connected to the system.

US 2004/0204779 A1 discloses a user interface that supports operator control of a sanitary facility, especially a whirlpool. This comprises a selector element that can be adjusted to several positions, making it possible to select the operating variable or function to be set for the sanitary facility. Via actuation of operator-control elements, the user of the sanitary facility is able to change the value for the selected operating variable or function, or else to switch the function in question on or off completely.

The fact that generic sanitary rooms have not yet found any relevant widespread use in practice, even though such program-controlled sanitary facilities or sanitary stations comprising such facilities were already described previously well over twenty years ago, and even though it is obvious that a need for comfort has already been persistently increasing for just as long within the population target group under consideration, this can be explained by the fact that truly practical portfolios have been lacking or are still lacking. A goal of the present invention is to achieve a remedy in this respect. In other words, the invention has made it an object to provide a sanitary room of the generic kind, which meets the highest requirements of comfort and at the same time satisfies practical requirements, especially those existing with respect to handling and use.

SUMMARY

The sanitary room described herein is therefore characterized not only by the generic features presented in the introduction but also by the following combination of features cooperating synergetically therewith as well as among one another:

- the programmable electronic control system has a water-program memory suitable for storage of several different water-delivery programs capable of being called, a lighting-program memory suitable for storage of several different lighting programs capable of being called, a sound-program memory suitable for storage of several different sound programs capable of being called and at least one data-processing unit, which actuates at least one actor of the metering and mixing valve unit, at least one lamp regulator and at least one sound generator;
- the sanitary station comprises a device-user interface that is associated with the sanitary facility and permits water-delivery program selection as well as manual modification of the selected water-delivery program;
- adjacent to the people entrance, a room-user interface is provided that permits lighting-program selection and sound-program selection as well as manual modification of the selected lighting program and of the selected sound program.

One of the characteristic features of the sanitary room accordingly consists in that the at least one sanitary unit of the sanitary station, the lighting device of the sanitary room and the sound device of the sanitary room are indeed controlled by means of a (common) electronic control system, but nevertheless at least two user interfaces are provided that are spatially separated from one another and are different with respect to their functionality. A room-user interface situated adjacent to the people entrance permits selection of a lighting program stored in the lighting-program memory and of a sound program stored in the sound-program memory—wherein respectively one lighting and one sound program are typically linked with one another as a scenario program and thus can be called together as a specific scenario—as well as manual modification of the selected lighting program and of the selected sound program (or of the combined scenario program), for example by individual modification of the brightness of the lighting device and of the loudness of the sound emitted by the sound device; accordingly, a device-user interface of the sanitary station associated with the sanitary facility permits selection of a water-delivery program as well as manual modification of the selected water-delivery program, for example by individual modification of the temperature and of the flow. In this way, the present disclosure takes an approach that is fundamentally different from the cited prior art, resulting in significantly greater practical utility.

For the sanitary room described herein and the advantages associated therewith, namely the high, heretofore unknown extent of user friendliness, a characteristic combination of structural and control-related features interacting with one another is therefore decisive, wherein the control-related features also specify in the following, where not explicitly described, the corresponding configuration of the programmable electronic control unit. In this respect, aspects relevant to the excellent user friendliness are the easy control capability, which can be achieved intuitively, with high flexibility and—according to preferred configurations—furthermore the excellent interaction with the user by virtue of the feedback thereto. With respect to these and further advantageous effects and viewpoints of sanitary rooms described herein, reference is made to the following description and especially also to the presentation of preferred further developments and configurations as well as the explanation of the preferred exemplary embodiment illustrated by diagrams.

One aspect that is very attractive for user friendliness and the user's feeling of comfort consists in the fact that, on the one hand, a functional subdivision—in the sense of predetermination of the parameters concerning the sanitary room in the broader sense (such as, in particular, the lighting and sound situation) via the room-user interface positioned adjacent to the entrance and of predetermination of the parameters concerning the sanitary facility (such as, in particular, water delivery) via the device-user interface forming part of the sanitary station—indeed takes place within the electronic control system, while on the other hand, because of the system interconnections—given appropriate configuration of the electronic control system—it is also possible for the lighting and sound situation (and possibly also other room parameters) to be influenced via the program selection that takes place at the device-user interface. According to one configuration of the invention that is particularly advantageous in this respect, it is specifically provided that at least part of the water-delivery programs is linked with lighting and/or sound program elements that can be matched individually to the respectively programmed water delivery. By means of control technology, it is particularly preferably provided in this respect that, in the case of a collision of lighting and/or sound program elements called via the room-user interface with such called—for example, as part of a water-delivery program—via the device-user interface and as the last to be called having chronological precedence and being executed; accordingly, the prioritization here is established not via the user-interface used for predetermination but instead solely via the basis of the predetermination sequence. According to a configuration alternative to this, however, it may also be provided by control technology that the device-user interface (or the predetermined conditions being executed via this) is/are favored in the sense of precedence over the room-user interface (or the predetermined conditions being executed via this). In this case, in the event of a collision of lighting and/or sound program elements called via the room-user interface with such called—for example, as part of a water-delivery program—via the device-user interface, the latter would have priority and be executed. Settings or program of predetermined conditions being undertaken at or via the device-user interface would accordingly dominate over settings or program of predetermined conditions being undertaken at or via the room-user interface.

According to another preferred further development of the invention, the sanitary room comprises at least one heating device, wherein the electronic control system has a heating-program memory suitable for storage of several different heating programs capable of being called and the room-user interface is configured to enable a heating-program selection. These terms "heating device" and "heating program" are to be understood—within the scope of the entire present application—as all-inclusive in the sense of regulation of room temperature, i.e. so broadly that room cooling according to a corresponding cooling program may also take place by means of the heating device. In this respect, the room-user interface preferably also permits manual modification of the selected heating program, for example via an individual manual modification of the predetermined temperature conditions.

The room-user interface preferably has a display, of which at least one partial region changes its color in dependence on a room parameter capable of being predefined by means of the room-user interface, via a program called by this. In this sense, the said partial region of the display is able to change its color in dependence on the predetermined temperature conditions of the heating program or manual modification thereof; in this way, supplementary information is supplied to the user via the display, and specifically in a form that intuitively can be very well perceived even in the case of reduced eyesight (for example, when eyeglasses have been taken off or contact lenses removed). According to a particularly preferred configuration, however, the color of the said partial region of the display corresponds to the color of the lighting mood of the lighting program called via the room-user interface, i.e. depends on the respectively called lighting program.

In the foregoing connection, not only may the heating of the sanitary room as a whole be involved, but so also (and possibly additionally) may locally active heating devices, for example for locally active radiant heaters, heating devices used for preheating hand towels, and the like. Particularly preferably in this respect, especially in view of further increased comfort, a lighting program, a sound program and a heating program are linked with one another as a (complex) scenario program and thus can be called together as a specific scenario. In this connection, the scenario in question may also comprise even corresponding further program elements, provided the programmable electronic control system also acts even on further devices present in the sanitary room. In this sense, the electronic control unit may also act, for example, on a blackout or privacy screen—mounted on a window—(e.g. a roller blind) or else on a device used to impart a fragrance to the room. In this sense, the sanitary room preferably comprises at least one window with a privacy screen or blackout device and/or at least one fragrance-imparting device, wherein the electronic control system has a privacy-screen program memory suitable for storage of at least one privacy-screen program capable of being called and/or at least one fragrance-imparting program memory suitable for storage of a fragrance-imparting program capable of being called, and the room-user interface is configured to activate the privacy-screen or blackout device and/or the fragrance-imparting device. From aspects of comfort, activation of these further devices also takes place particularly preferably according to the respectively called scenario program, so that the scenario program also comprises privacy-screen program elements or fragrance-imparting program elements. In this connection, it is clear to a person skilled in the part that the various program memories do not have to be discrete structural elements, spatially separated from one another structurally, but instead that a uniform, common program memory may be provided for storage of all programs and program elements such that they are capable of being called.

According to a particularly preferred further development of the invention, the electronic control system comprises a user-identification module, and a user-identification signal generated thereby can be supplied to the central data-processing unit for a person-specific preselection of the lighting programs and sound programs offered for selection at the room-user interface, as can water-delivery programs offered for selection at the device-user interface. Thus, with respect to the lighting programs and sound programs offered for selection at the room-user interface, as well as with respect to the water-delivery programs offered for selection at the device-user interface, preselection that depends on the output signal of the user-identification module takes place from all water-delivery programs stored in the water-delivery program memory, lighting programs stored in the lighting program memory and sound programs stored in the sound program memory. Not every user receives the same portfolio of water-delivery programs with correspondingly preset parameters; to the contrary, varied different individually compiled lighting and sound portfolios and water-delivery program portfolios are presented to the persons using the sanitary facility in question. This facilitates and accelerates program selection and makes it particularly convenient.

This user-identification sensor may rely, for example, on biometric features (e.g. movement patterns, fingerprints, facial patterns, voice patterns, etc.) of the respective user or on technical features such as, for example, recognition codes of personal devices or transponders on personal equipment. In view of the greater need for intimacy typically associated precisely with the use of sanitary facilities, it is particularly preferable for this user identification sensor—if it is designed for remote sensing of biometric features of the person using the sanitary facility—to be adjustable between a sensing configuration and a blind configuration that can be physically distinguished therefrom. In this sense, it is possible, for example, for a camera designed for sensing of movement patterns or facial patters to be adjustable between a detection configuration extended from a housing or an enclosure and a blind configuration retracted into the housing or into the enclosure. Thus it is directly and immediately obvious for the user whether the sensing of his or her biometric features is activated or deactivated. In this connection, the user identification sensor can be automatically adjusted to its blind configuration, for example by the central data-processing unit, after user identification has been established; automatic adjustment back to the sensing configuration by means of the central data-processing unit may then be initiated, for example, when the person in question leaves the sanitary room, for which purpose a (separate) person-presence sensor is able to act on the data-processing unit. Or the user-identification sensor is adjusted to the sensing configuration by the central data-processing unit, when a person-presence sensor acting on the data-processing unit recognizes that a person has entered the sanitary room. Another preferred option is that the user identification sensor will be adjusted in situation-based manner from its sensing configuration to its blind configuration (and vice versa) by the central data-processing unit according to criteria defined by the user in question himself or herself.

Particularly preferably, a standard lighting program is stored in the lighting program memory and is used as long as the user-identification module has not generated any output signal that can be associated with a specific registered user, wherein an individual modification of the brightness of the lighting device is possible via the room-user interface.

Alternatively or in addition to the user-specific preselection explained in the foregoing, a preselection of the lighting, sound and/or scenario programs offered for selection at the room-user interface and/or of the water-delivery programs offered for selection at the device-user interface may also take place in dependence of weekday and/or time of day. The user in question assigns specific time preferences to his or her personal scenario programs stored in the programmable control system, so that, for example, a different scenario program portfolio is presented to him or her at the room-user interface on a weekday as compared with a weekend, as is a different program portfolio on the same day in the morning as compared with the evening. For this purpose, it is preferred to provide a timer, wherein a time signal generated thereby can be supplied to the central data-processing unit to bring about a time-specific program preselection in the above sense.

In structural respect—and according to yet another preferred further development of the invention—the room-user interface has a display, a setting-selector ring extending around the display and capable of being turned around an axis perpendicular to the display, with a circumferential gripping face accessible from radially outside, and four buttons disposed around the setting-selector ring, wherein the setting-selector ring and/or the display can be shifted axially for actuation of a momentary-contact confirmation switch and the four buttons are designed as program-selection button, as lighting button, as sound button and as temperature button, such that, upon their actuation—by turning of the setting-selector ring—a signal supplied by a rotary-position transducer of the setting-selector ring is processed in the central data-processing unit in the sense of a scenario-program selection, a brightness modification within a called lighting program (as part of the scenario program), a loudness modification within a called sound program (as part of the scenario program) and a temperature modification within a called heating program (as part of the scenario program). This permits the respective user to achieve manageable operator control particularly easily and intuitively; in this way, burdensome operator errors can be avoided.

With the four buttons, one of which is linked with the program selection, i.e. the selection of a specific scenario program from the portfolio stored in the program memory (and possibly specially for the individual user, see above), and the three others are linked with the personal and momentary modification of the called scenario program by individual change of particularly characteristic ("primary") parameters of the scenario (brightness, loudness, temperature), it is possible in a practical way to operate even sanitary rooms that are capable of executing scenario programs having a high degree of complexity. This is possible because it has been shown that, for further ("secondary") parameters characteristic of the respective scenario, the need for modification within the respectively called scenario program is only rather modest, so that—in the interests of user-friendly handling—the possibility of such an intervention—executed manually via the room-user interface—into the program is disregarded. For influencing/varying such further parameters of the scenario, an alternative to the option of modification by manual actuation of the room-user interface (i.e. the buttons and the setting-selector ring) may be, for example, to provide an acoustic input with a voice-control module (voice assistant) and/or an option of modification per app on a mobile terminal device. Incidentally, another conceivable option is storage of a separate scenario program modified in just that "secondary" parameter as well as the possibility of influencing or controlling such "secondary" room parameters via the water-delivery program called respectively at the device interface (see above). Such parameters of the scenario program, which may not be capable of modification manually via the room-user interface within the called scenario program but can be changed (only) via selection of a different scenario program or in some other way (e.g. by voice control), may consist, for example, in imparting fragrance to the room and activating a privacy screen.

Particularly preferably in this respect, the display of the room-user interface is provided with a central display region and a peripheral display region surrounding it annularly, wherein the peripheral display region comprises four segments associated spatially with the buttons and respectively having a function-value status display of the button function in question, and upon button actuation, a (correspondingly enlarged) display of the instantaneous setting value of the button function in question appears in the central display region. The operator friendliness also benefits from this. Specifically, the control unit in this situation can be configured such that, by button actuation, the function-value status display of the button function in question is extinguished in the associated peripheral display region. Thus the effect achieved by the display of the instantaneous setting value of the button function in question in the central display region is even further intensified.

In the process, the four segments of the peripheral display region of the display of the room-user interface are able to change their color in the sense already discussed hereinabove in dependence on the set temperature, i.e. that predetermined via the called temperature program or via the called scenario program or modified manually. What can be perceived particularly well by the user in this case is a color variation from blue tones (for temperature set to low) to red tones (for temperature set to high).

Again from viewpoints of user friendliness, it is particularly advantageous when the room-user interface and the at least one device-user interface are designed to match one another structurally. In particular, the respective program selection, i.e. the selection of a scenario program at the room-user interface and the selection of a water-delivery program at the device-user interface should also be possible in this case via actuation of buttons in matching positions (e.g. at top left).

In the interests of particularly high user comfort, the electronic control system is provided particularly preferably with an individually executed modification of the modification memory in which the called scenario program is stored. The storage mode for this purpose depends on the individual needs, requirements or circumstances. Thus, for example, permanent storage of the respective modification may be achieved, possibly as a supplementary (modified) scenario program that can be called again later in addition to the unmodified scenario program constituting the basis. However, only temporary storage is also conceivable, for example lasting only until the user in question has left the sanitary room.

The various programming options, especially the creation of personal scenario programs that can be called via the room-user interface, are preferably executed by the respective user by means of a mobile terminal device, specifically by an app installed thereon. Against this background, the control unit expediently comprises a data-communication interface (e.g. WiFi or Bluetooth), especially for inputting program data created on or via an external device. Incidentally, it is possible via the data-communication interface to achieve—and this in turn acts very positively on the user's comfort—preparation of the sanitary room and/or the sanitary facility for later use even remotely and in advance, especially by appropriately early startup of the heating device or appropriately early filling of the bathtub.

BRIEF DESCRIPTION OF THE DRAWING

The present invention will be explained in more detail in the following on the basis of a preferred exemplary embodiment illustrated—partly schematically—in the drawing, wherein FIG. 7 shows a user interface of the app—installed on a mobile terminal device—for programming the electronic control system, and FIG. 8 shows the user interface used for programming the shower.

DETAILED DESCRIPTION OF THE PREFERRED EMBODIMENTS

Figure 1:
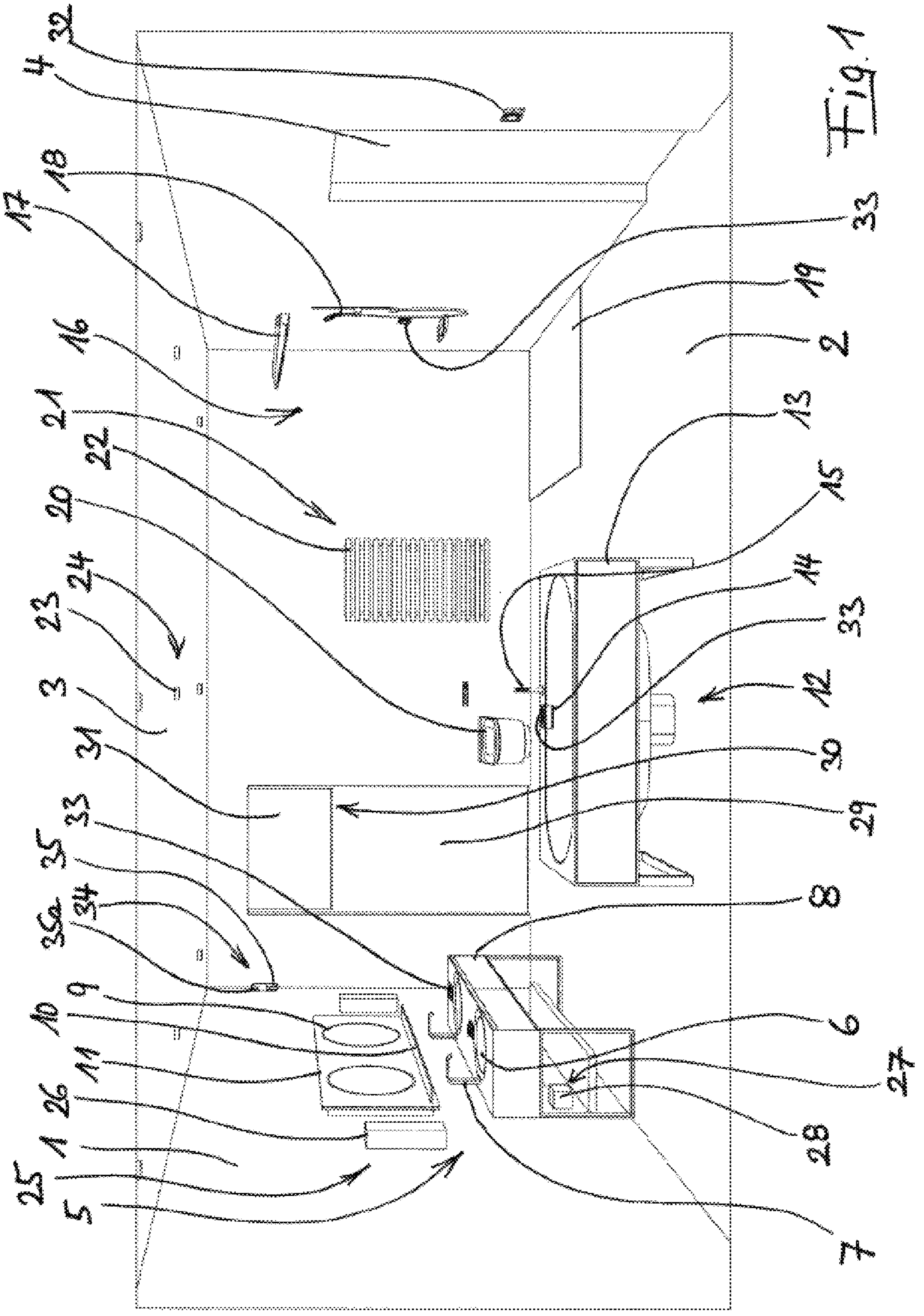
FIG. 1 shows a sanitary room.

The sanitary room illustrated in FIG. 1, bounded by walls 1, floor 2 and ceiling 3 and accessible via people entrance 4, is equipped with diverse sanitary stations. A washing station 5 comprises a double washing stand 8 provided with two basins 6 and associated water outlets 7 and a lighting element 9 and a wall mirror 11 provided with a shelf 10. A bath station 12 comprises a bathtub 13 having a main filling outlet 14 and a hand-held spray outlet 15. A shower station 16 likewise comprises, as described hereinafter in detail with reference to FIG. 3, two water outlets, namely an overhead spray 17 and a hand-held spray 18 as well as a shower tray 19. Further inventory of the sanitary room are a commode 20, a heating device 21 in the form of a wall-mounted heater 22, a lighting device 24 designed as an array of ceiling lamps 23, a sound device 25 having a multiplicity of speakers 26 and a fragrance-imparting device 27 in the form of a fragrance dispenser 28, suitable for delivery of several different fragrances/aromas. Furthermore, a window 29 provided in one of the walls 1 is equipped with a privacy-screen device 30, which is designed as a motorized roller blind 31.

The sanitary room is equipped with a programmable electronic control system (see also FIG. 2), which acts in controlling relationship on the said sanitary stations—especially for control of the respective water delivery—as well as on the further amenities of the sanitary room (especially heating device 21, lighting device 24, sound device 25, fragrance-imparting device 27 and privacy-screen device 30). FIG. 1 also shows the various user interfaces belonging to the programmable electronic control system, namely room-user interface 32 situated next to people entrance 4 and device-user interfaces 33 provided at the individual sanitary stations. Finally, a user-identification module 34 connected to central data processing unit 41 is also apparent.

This is designed as an edge-computing camera 35, which senses the movement pattern of the persons entering through people entrance 4 and—if the movement pattern matches one of the locally stored movement patterns—identifies the person in question. Due to identification of the user in the peripheral equipment, i.e. in edge-computing camera 35, there is no need for communication of the sensed movement data to central data-processing unit 41. The user-identification signal generated in edge-computing camera 35 and supplied to central data-processing unit 41 is evaluated in central data-processing unit 41 for a person-specific preselection of the scenario programs offered for selection at room-user interface 32 and executes the water-delivery program offered for selection at device-user interface 33. This edge-computing camera 35 can be adjusted between a sensing configuration and a blind configuration that can be physically distinguished therefrom, in that, in the latter case, it is lowered completely into a housing 35*a*.

Figure 2:
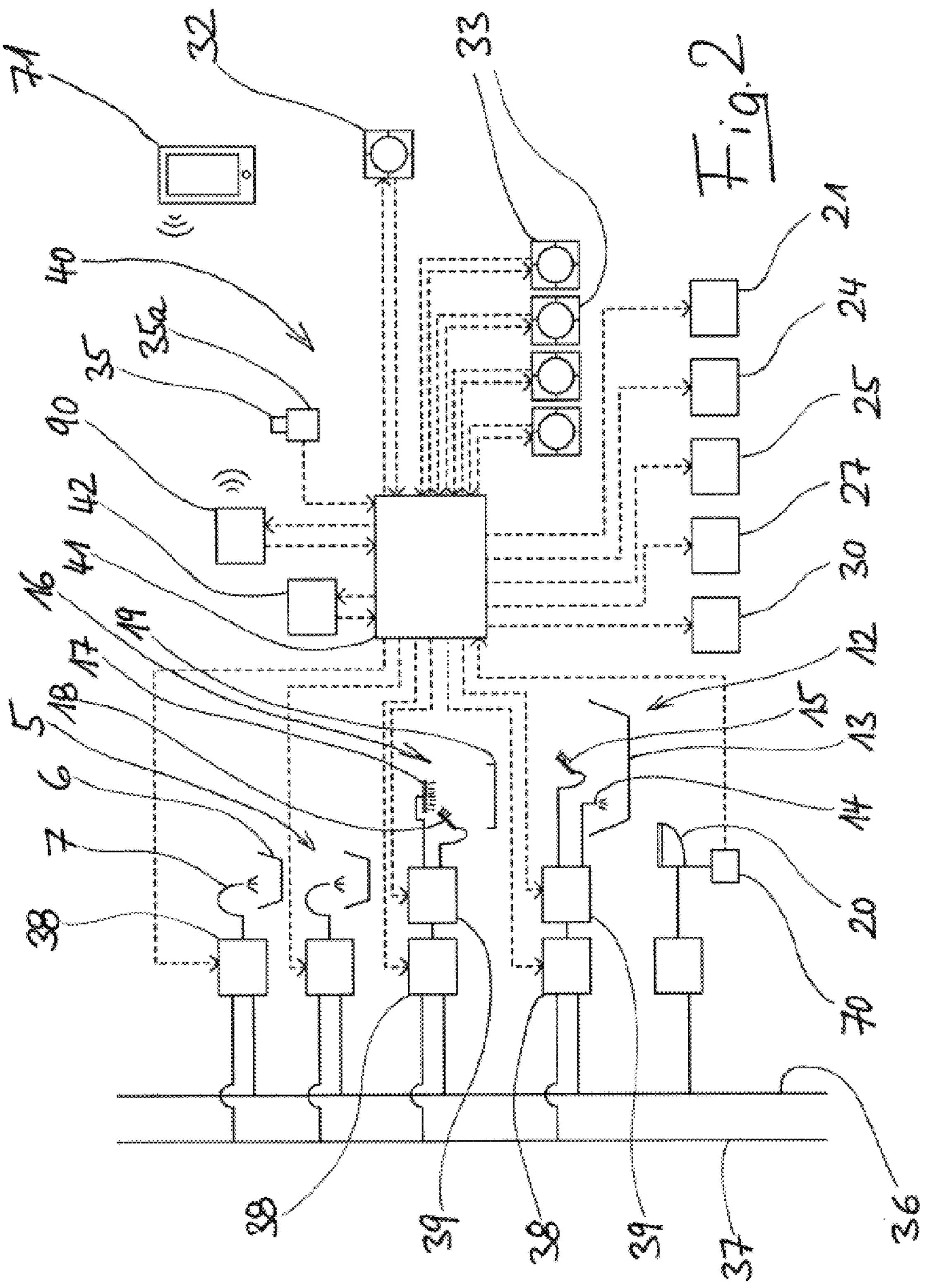
FIG. 2 shows the programmable electronic control system implemented for the sanitary room according to FIG. 1.

According to the schematic diagram of FIG. 2, a metering and mixing valve unit 38 connected to a cold-water pipe 36 and a hot-water pipe 37 is associated with each of the two outlets 7 of double washing stand 8. The situation is analogous for bath station 12 and shower station 16, wherein distributing valve 39—permitting the option of selection respectively between two different water outlets—is additionally connected downstream from each. Both metering and mixing valve units 38 and distributing valves 39 are controlled by programmable electronic control system 40; for this purpose, (central) data processing unit 41 of electronic control system 40 acts on actuators (not shown) of the said valves or valve units. Furthermore, electronic control system 40 comprises a program memory 42, in which the various programs and program elements capable of being called (see below) are stored so that they can be called for data-processing unit 41. Room-user interface 32 communicates with data-processing unit 41, as do the four device-user interfaces 33, wherein these are combined input and output terminals, as will be explained in detail hereinafter. Merely for reasons of illustration (in the schematic FIG. 2), the four device-user interfaces 33 are shown next to one another and spatially separated from the sanitary facilities activated respectively by them; in the practical layout (see FIG. 1), device-user interfaces 33 are actually part of the respective sanitary station and thus are distributed over the sanitary room directly adjacent to the respectively activated sanitary facility.

Camera 35—connected to data-processing unit 41—is an input unit in the sense that it is processed as the identification signal supplied by it during program preselection. In addition to the valves/valve units of the sanitary station, heating device 21, lighting device 24, sound device 25, fragrance-imparting device 27 and privacy-screen device 30 are activated by data-processing unit 41 according to the programs or program elements respectively being executed.

Figure 3:
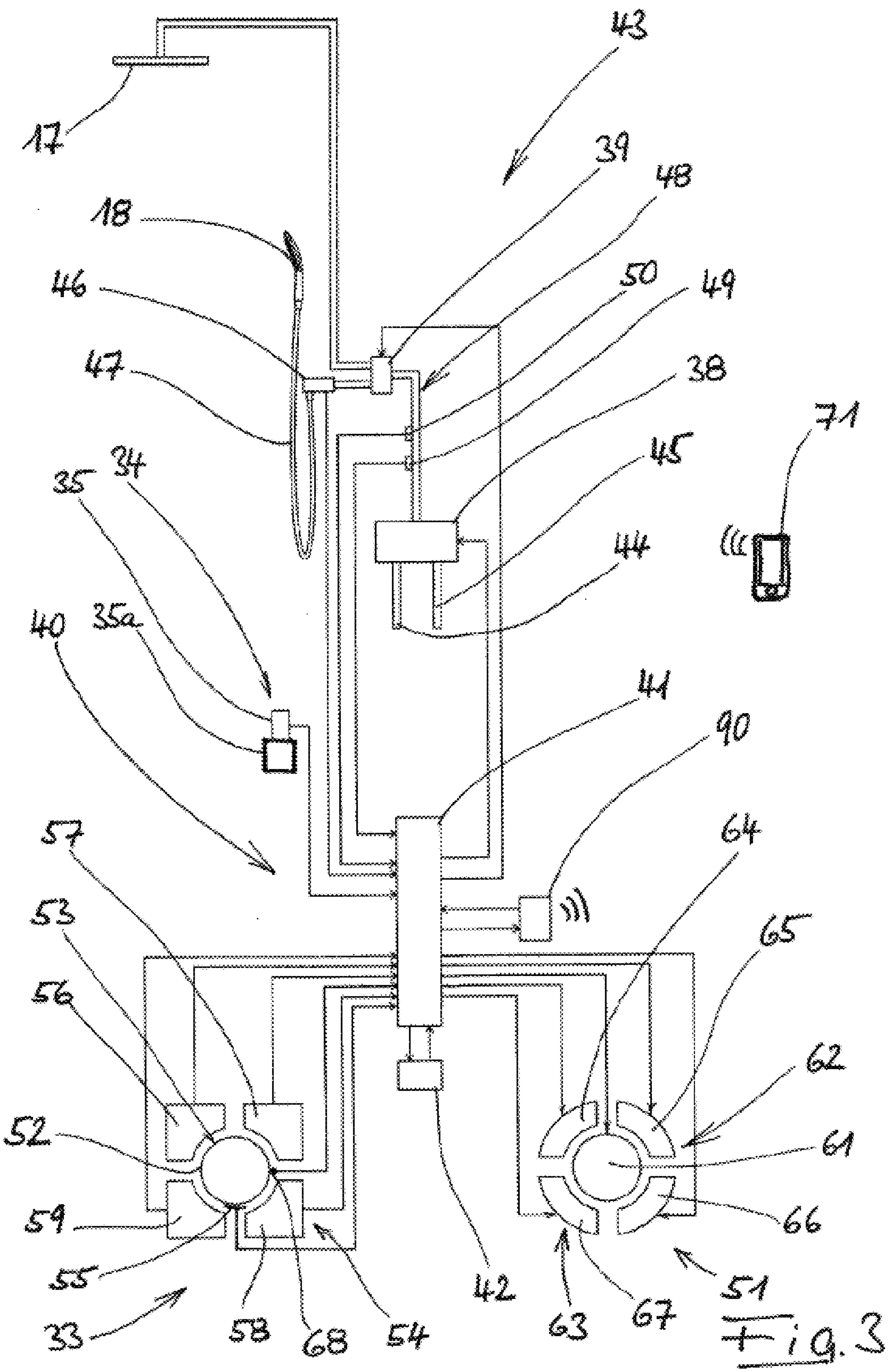
FIG. 3 shows a sanitary facility that can be used in the sanitary room according to FIG. 1 in the form of a shower, plus the regions of the programmable electronic control system relevant for it.

As an example for the sanitary stations of the sanitary room, shower station 16 and the region of the control system associated therewith will be explained in more detail in the following with reference to FIGS. 3 to 5D. Shower 43 shown in FIG. 3 is provided—in known manner—with a cold-water supply 44, a hot-water supply 45, a metering and mixing valve unit 38, a distributing valve 39 and two water outlets in the form of an overhead spray 17 and a hand-held spray 18 (plus wall mount/holder 46 and hose 47). The corresponding components are interconnected in well-known and standard manner via water-conveying lines 48.

For control of the water delivery via overhead spray 17 or hand-held spray 18 with a specified flow and a specified temperature, metering and mixing valve unit 38 and distributing valve 39 are actuated by programmable electronic control system 40. For this purpose, central data-processing unit 41 of electronic control system 40 acts on actuators (not illustrated) associated with metering and mixing valve unit 38 as well as distributing valve 39.

The current water temperature and the current water flow downstream from metering and mixing valve unit 39 are sensed respectively via a temperature sensor 49 and a flowmeter 50, and the measured values in question are supplied for temperature and flow regulation to central data-processing unit 41.

Electronic control system 40 is programmable in the sense that water delivery via the two water outlets takes place under program control. For this purpose, electronic control system 40 comprises a program memory 42 that is suitable for storage of several different water-delivery programs capable of being called, and it communicates with central data-processing unit 41. Furthermore, device-user interface 33 associated with shower 43 to permit selection of the water-delivery program to be executed as well as manual modification thereof communicates with central data-processing unit 41.

Figure 4:
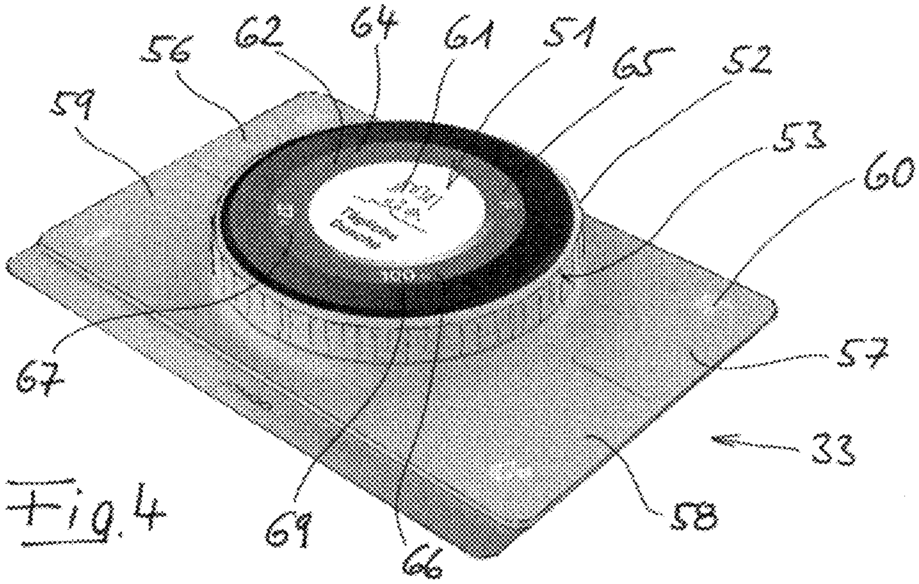
FIG. 4 shows the device-user interface of the shower according to FIG. 3 in perspective view.
Figure 5A:
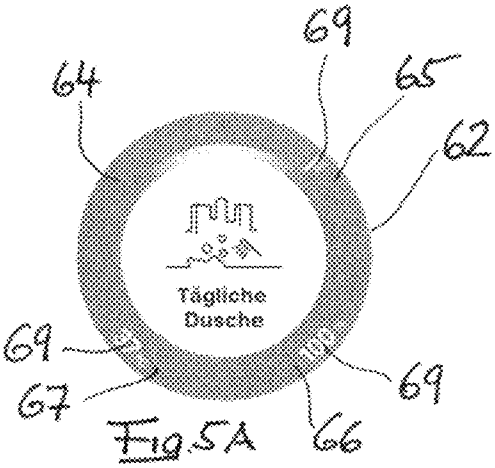
FIGS. 5A, 5B, 5C and 5D show the display of the device-user interface of FIG. 4 in different operating phases.
Figure 5B:
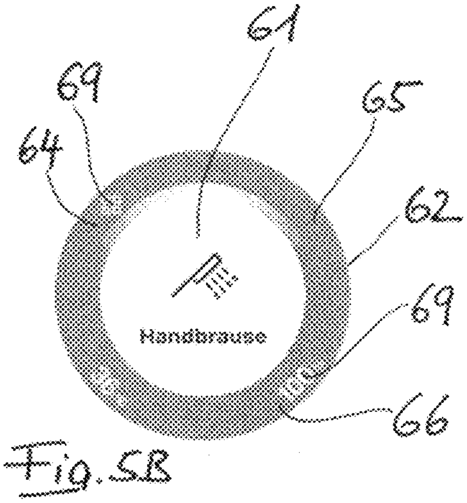
Figure 5C:
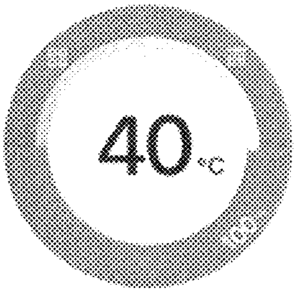
Figure 5D:
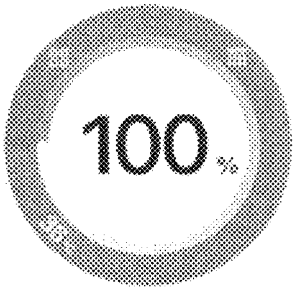
Figure 6A:
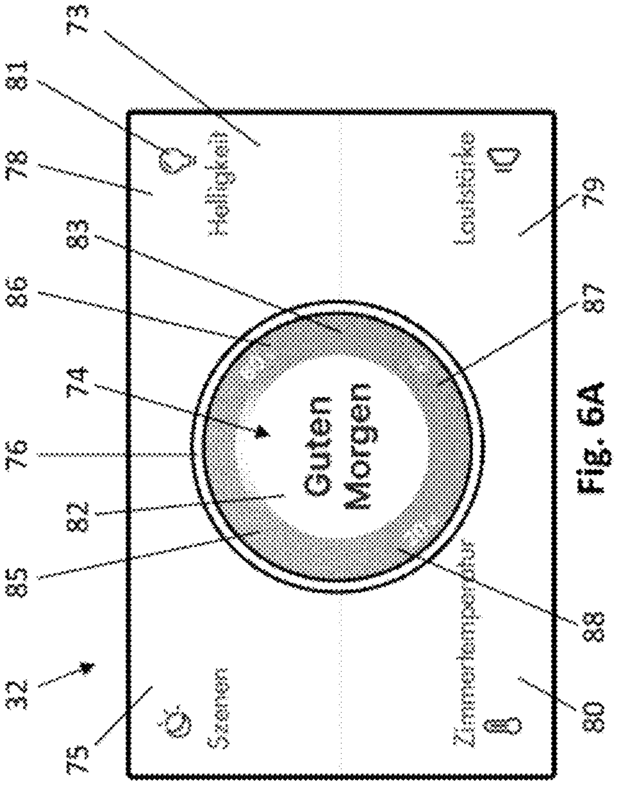
FIGS. 6A, 6B, 6C and 6D show the display of the room-user interface of the sanitary room of FIG. 1 in different operating phases.
Figure 6B:
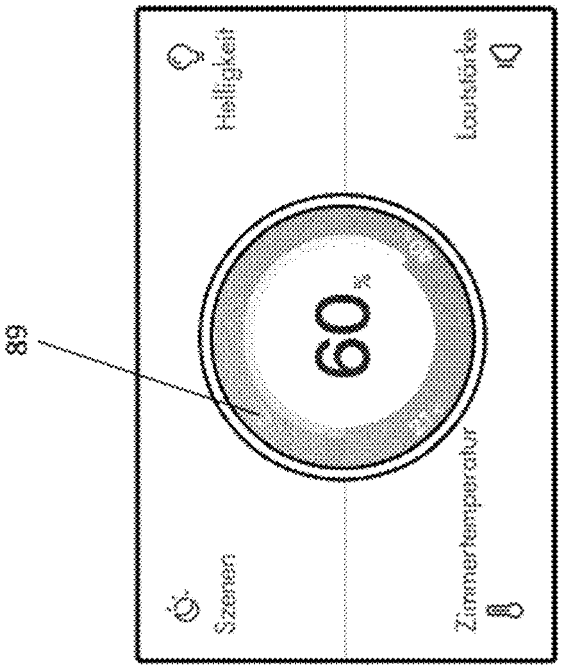
Figure 6C:
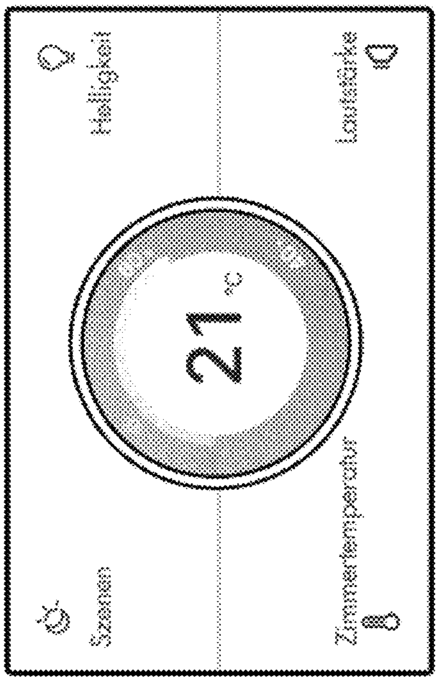
Figure 6D:
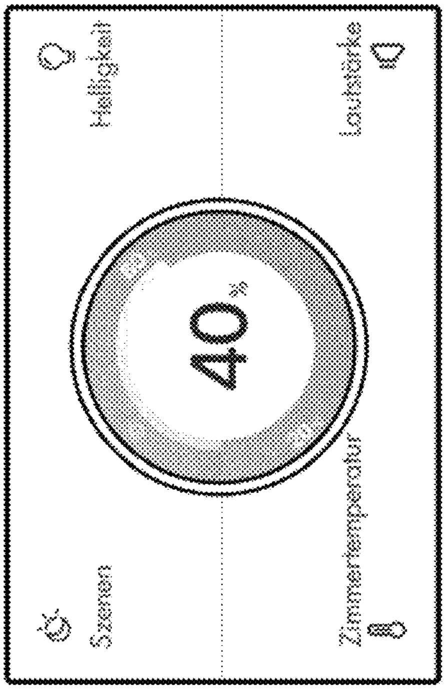

Whereas device-user interface 33 in FIG. 4 is illustrated in its spatially physical design, its individual elements, parts, components and regions are, for reasons of illustration, isolated from one another in FIG. 3. Device-user interface 33 has a round display 51, a setting-selector ring 52 extending around display 51 and capable of being turned around an axis perpendicular to display 51, with a circumferential gripping face 53 accessible from radially outside as well as four buttons 54 disposed around setting-selector ring 52 and set back relative to this as well as display 51. Setting-selector ring 52 cooperates with a rotary-position transducer 55 of the setting-selector ring associated with it. According to the functions assigned to them (see below), the four buttons 54 are a program-selection button 56, an outlet-selection button 57, an output button 58 and a temperature button 59. All four buttons 54 have a backlit function symbol 60 symbolizing their function.

Display 51 has a central display region 61 and a peripheral display region 62 surrounding it circularly. The latter comprises, spatially associated with buttons 54, four segments

63 in the form of a program-display segment 64, an outlet-display segment 65, an output-display segment 66 and a temperature-display segment 67.

Electronic control system 40 is configured such that, after actuation of program-selection button 56 during turning of setting-selector ring 52, a signal supplied by rotary-position transducer 55 of the setting-selector ring is processed in central data-processing unit 41 in the sense of water-delivery program selection. By continued turning of setting-selector ring 52, symbols assigned to the individual water-delivery programs stored in program memory 42 and symbolizing them are displayed successively in central display region 61 of display 51. When display 51—which is mounted to be axially movable—is pressed, a momentary-contact confirmation switch 68 is actuated and in this way the water-delivery program displayed via the associated symbol in central display region 61 of display 51 is confirmed or called. It is called by central data-processing unit 41 from program memory 42.

Within the respectively called water-delivery program, the user manually may make individual modifications of characteristic water-delivery parameters via device-user interface 33, so that the delivery of water—deviating correspondingly from the called program—may be adapted individually to the personal needs. For this purpose, electronic control system 40 is configured such that a signal supplied by rotary-position transducer 55 of the setting-selector ring in the sense of a temperature modification after actuation of temperature button 59—by turning setting-selector ring 52—a signal supplied by rotary-position transducer 55 of the setting-selector-ring in the sense of a flow modification after actuation of output button 58 and a signal supplied by rotary-position transducer 55 of the setting-selector-ring in the sense of a switch of water outlet after actuation of outlet-selection button 57 are processed in central data-processing unit 41.

Regardless of any operator control of device-user interface 33, automatic switching of the water delivery to hand-held spray 18 takes place when this is removed from holder 46. For this purpose, holder 46 has an embedded sensor (in-use sensor), which generates an in-use signal to be supplied to central data-processing unit 41 upon removal of hand-held spray 18.

Each of the four segments 63 of peripheral display region 62 has a function-value status display 69 of the button function in question. Thus the instantaneous, current function/setting values—possibly resulting from modification of the called program (see above)—for water temperature, water flow and water outlet are displayed by means of function-value status displays 69 embedded in temperature-display segment 67, in output-display segment 66 and in outlet-display segment 65 of peripheral display region 62 of display 51. However, upon actuation of one of the buttons 54, function-value status display 69 in segment 63 of peripheral display region 62 associated with that button is extinguished; and the instantaneous function/setting value that can be adjusted by means of setting-selector ring 52 after actuation of the button 54 in question is displayed in correspondingly large characters in central display region 61 of display 51, so that the change can be recognized particularly easily by the user. This is illustrated in FIGS. 5A to 5D, wherein device-user interface 33 is set—by corresponding previous button actuation—according to FIG. 5A in program-selection mode, according to FIG. 5B in water-outlet modification mode, according to FIG. 5C in temperature modification mode and according to FIG. 5D in water-flow modification mode.

Furthermore, electronic control system 40 is configured such that segments 63 of peripheral display region 62 change color together to correspond to the set water-delivery temperature; thus annular peripheral display region 62 changes color as a whole—in gradual stages—from blue (at low water temperatures) to red (at high water temperatures). Furthermore, at a predetermined time (e.g. two seconds) after the last actuation of device-user interface 33, the temperature-modification mode, in which turning of setting-selector ring 52 brings about a change of the set temperature, is activated.

For washing station 5 and bath station 12, device-user interfaces 33 have structurally identical design. However, the three modification buttons and the regions of the display associated therewith are assigned different functions. At washing station 5, the values predetermined by the respectively called water-delivery program for washbasin level or filling level, water flow and water temperature can be modified within such programs, as can the values predetermined by the respectively called water-delivery program for filling volume, water flow and water temperature at bath station 12.

Commode 20 is designed as an intelligent commode. It is equipped with a device 70—connected to central data-processing unit 41—for urinalysis. Important characteristic parameters of the urine are analyzed ad hoc and compared with expectation values (plus tolerance band) stored specifically for the respective person in program memory 42. If a significant deviation is detected, a notification—via an appropriate message to smartphone 71 communicating with electronic control system 40—is provided to the user (or if applicable to a caregiver), together with a dietary supplement recommendation.

Via room-user interface 32, it is possible to call—as a so-called "scenario", for which especially the temperature, lighting and sound parameters are definitive—the room situation or atmosphere prevailing in the sanitary room while it is in use. For this purpose, scenario programs are stored in program memory 42 that in the present case also comprise program elements concerning the setting of privacy screen 30 and of fragrance-imparting device 27 in addition to respective settings for heating device 21, lighting device 24 and sound device 25.

Room-user interface 32 has a design structurally identical to that of device-user interface 33 explained in detail in the foregoing. In this respect, reference is made to the explanations in question. However, the functional assignment of buttons 73 and of the various regions and segments of display 74 is different. And specifically (see FIGS. 6A-6D), room-user interface 32 is equipped with a program-selection button 75—used for selection of one of the offered scenario programs—as well as with three further buttons which—in cooperation with setting-selector ring 76 and the momentary-contact confirmation switch—are used for individual modification of the lighting situation, sound situation and temperature situation predetermined by the respectively selected scenario program. These three further buttons are brightness button 78, loudness button 79 and temperature button 80. All four buttons 73 again have a backlit function symbol 81 symbolizing their function.

Display 74 of room-user interface 32 has a central display region 82 and a peripheral display region 83 surrounding it circularly. The latter comprises, spatially associated with buttons 73, four segments 84 in the form of a program-display segment 85, a brightness-display segment 86, a loudness-display segment 87 and a temperature-display segment 88. Each of the four segments of the peripheral display region has a function-value status display 89 of the button function in question. Thus the instantaneous, current function/setting values—possibly resulting from modification of the called scenario program (see above)—for brightness, loudness and room temperature are displayed by means of function-value status displays 89 embedded in brightness-display segment 86, in loudness-display segment 87 and in temperature-display segment 88 of peripheral display region 83 of display 74. However, upon actuation of one of the buttons 73, function-value status display 89 in segment 84 of peripheral display region 83 associated with that button is extinguished; and the instantaneous function/setting value that can be adjusted by means of setting-selector ring 76 after actuation of the button 73 in question is displayed in correspondingly large characters in central display region 82 of display 74, so that the change can be recognized particularly easily by the user. This is illustrated in FIGS. 6A to 6D, wherein room-user interface 32 is set—by corresponding previous button actuation—according to FIG. 6A in program-selection mode, according to FIG. 6B in brightness modification mode, according to FIG. 6C in temperature modification mode and according to FIG. 6D in loudness modification mode.

It is important not only that the parameters concerning the room situation (existing lighting, sound, temperature, fragrance and privacy screen) can be predetermined—by means of room-user interface 32—via scenario programs to be called, but also that water-delivery programs—to be called by means of the respective device-user interface 33—are able to contain corresponding program elements. In the event of a collision, in other words, for example, of different predetermined conditions for setting the lighting device or the sound device, the predetermined conditions of device-user interface 33 have precedence on the basis of appropriate configuration of electronic control system 40.

For its programming by means of an external mobile edge device, namely a smartphone 71, on which an app designed and suitable for the purpose is installed, electronic control system 40 is provided with a data-communication interface 90. FIGS. 7 and 8 show, by way of example, a possible smartphone user interface of the corresponding app, and specifically, on the one hand (FIG. 7), at the level of programming of a scenario program—in this case called "My Morning" and illustrated with a specific pictorial symbol 91, which corresponds to the room-user symbol displayed on room-user interface 32—and on the other hand (FIG. 8), at the level of programming of a specific water-delivery program—in this case called a "Cool Down Shower" and illustrated with a specific pictorial symbol 92, which corresponds to the program symbol displayed on device-user interface 33.

FIG. 7 shows the predetermined conditions selected by the user for the "My Morning" scenario program, namely preferences for times of use from 07:00 a.m. until 11:00 a.m. before noon, i.e. 23° C. for room temperature, "My morning playlist" for the sound program to be played back, lighting via three lamps dimmed to 80%, privacy screen at 50% (on the left window) and 75% (on the right window). By pressing the "Edit" button, the user switches to setting or change mode.

FIG. 8 shows the predetermined conditions selected by the user for the "Cool Down Shower" water-delivery program, namely—in each case at 100% water flow—with the water outlet/temperature sequence set to 20° C. for "Waterfall Spray" and to 37° C. for "Rain Spray", with lighting according to the "Cool Down Light" program and playback of the "Kugou" and "Cool Down Songs" sound-program sequence. Once again, the user switches to setting or change mode by pressing the "Edit" button. Provided shower 43 is equipped with appropriate hardware, addition of a body-care agent, for example, to the water being delivered could also be assigned to the "Cool Down Shower" water-delivery program by using the programming app; and above and beyond the settings of lighting and sound devices, it would also be possible as part of the water-delivery program (taking precedence over predetermined conditions of the respectively called scenario program) to predetermine further room parameters, such as, for example, setting of heating device 21 or of privacy-screen device 30.

What is claimed is:

1. A sanitary room of a building, having an entrance (4), at least one sanitary station (5, 12, 16), a lighting device (34) and a sound device (25), wherein

- the sanitary station (5, 12, 16) is provided with a sanitary facility having a cold-water supply (44), a hot-water supply (45), at least one water outlet and a metering and mixing valve unit (38), which is suitable for controlling a total flow through the at least one water outlet and a ratio of a partial quantity of cold water to a partial quantity of hot water in the total flow, and
- a programmable electronic control system (40) is configured to act on the metering and mixing valve unit (38), the lighting device (24) and the sound device (25), wherein:

- the programmable electronic control system (40) has a water-program memory (42) for storage of several different water-delivery programs, a lighting-program memory (42) for storage of several different lighting programs, a sound-program memory (42) for storage of several different sound programs and at least one data-processing unit (41) for actuating at least one actuator of the metering and mixing valve unit (38), at least one lamp regulator and at least one sound generator;
- the sanitary station (5, 12, 16) comprises a device-user interface (33) that is associated with the sanitary facility and permits water-delivery program selection as well as manual modification of the selected water-delivery program;
- adjacent to the entrance (4) and spatially separated from the device-user interface, a room-user interface (32) is provided that permits lighting-program selection and sound-program selection as well as manual modification of the selected lighting program and of the selected sound program.

2. The sanitary room of claim 1, wherein the electronic control system (40) further comprises a user-identification module (34) wherein, the user-identification module generates an output signal that defines a preselection of a water-delivery program stored in the water program memory (42), lighting program stored in the lighting program memory (42) and sound program stored in the sound program memory (42).

3. The sanitary room of claim 2, wherein a standard lighting program is stored in the lighting program memory (42) and is used unless the user-identification module (34) generates an output signal that can be associated with a specific registered user.

4. The sanitary room of claim 2, wherein the user identification module (34) comprises a user-identification sensor (35), adjustable between a sensing configuration and a blind configuration that physically distinguishable therefrom, wherein the user-identification sensor is adjusted to its blind configuration by the data-processing unit after user identification has been established.

5. The sanitary room of claim 4, wherein a person-presence sensor acts on the data-processing unit such that the user-identification sensor (35) is adjusted from its blind configuration to its sensing configuration upon determining that a previously identified user has left the sanitary room or that a person enters the sanitary room through the entrance (4).

6. The sanitary room of claim 1, wherein the sanitary room comprises at least one heating device (21), wherein the electronic control system (40) has a heating-program memory (42) for storage of several different heating programs and wherein the room-user interface (32) is configured to enable a heating-program selection.

7. The sanitary room of claim 6, wherein the room-user interface (32) permits manual modification of the selected heating program.

8. The sanitary room of claim 6, wherein the room-user interface (32) has a display (74), of which at least one partial region changes its color based on the selected lighting program.

9. The sanitary room of claim 1, wherein the sanitary room comprises at least one fragrance-imparting device (27), wherein the electronic control system (40) has a fragrance-imparting-program memory (42) for storage of at least one fragrance-imparting program and the room-user interface (32) is configured for activation of the fragrance-imparting device.

10. The sanitary room of claim 9, wherein the sanitary room comprises at least one window (29) having a privacy screen and/or blackout device (30), wherein the electronic control system (40) has a blackout-program memory (42) for storage of at least one blackout program and the room-user interface (32) is configured for activation of the privacy-screen and/or blackout device (30).

11. The sanitary room of claim 1, wherein the electronic control system (40) is configured for linking of the lighting programs and the sound programs such that the lighting programs and the sound programs can be called at the room-user interface (32) in combination as complex scenario programs.

12. The sanitary room of claim 11, further comprising a timer, wherein a time signal generated by the timer is supplied to the data-processing unit (41) to actuate a time-specific preselection of a complex scenario program of the complex scenario programs.

13. The sanitary room of claim 1, wherein the room-user interface has a display (74), a setting-selector ring (76) extending around the display (74) and configured to be rotated about an axis perpendicular to the display (74), with a circumferential gripping face accessible from radially outside, and four buttons (73) disposed around the setting-selector ring (76), wherein the setting-selector ring (76) and/or the display (74) can be shifted axially for actuation of a momentary-contact confirmation switch and the four buttons (73) are designed as program-selection button (75), as lighting button (78), as sound button (79) and as temperature button (80), such that, upon their actuation, a signal supplied by a rotary-position transducer of the setting-selector ring is processed in the central data-processing unit (41) as a scenario-program selection, a brightness modification within a called lighting program, a loudness modification within a called sound program or a temperature modification within a called heating program.

14. The sanitary room of claim 13, wherein the display (74) is provided with a central display region (82) and a peripheral display region (85) surrounding it annularly, wherein the peripheral display region (85) comprises at least three segments (84) associated spatially with the buttons (73) and having respectively a function-value status display (89) corresponding to a spatially associated button, and upon button actuation a display of the instantaneous setting value of a corresponding button function appears in the central display region (82).

15. The sanitary room of claim 13, wherein the buttons (73) respectively have a backlit function symbol (81).

16. The sanitary room of claim 1, wherein the electronic control system (40) is equipped with an acoustic control module, which permits voice control.

17. The sanitary room of claim 1, wherein the room-user interface (32) and the at least one device-user interface (33) are designed to match one another structurally.

18. The sanitary room of claim 1, wherein the electronic control system (40) comprises a data-communication interface (90) for inputting program data created on an external device (71).

* * * * *